(12) United States Patent
Sanders et al.

(10) Patent No.: US 7,627,712 B2
(45) Date of Patent: Dec. 1, 2009

(54) METHOD AND SYSTEM FOR MANAGING MULTI-PLANE MEMORY DEVICES

(75) Inventors: Richard Sanders, Hutto, TX (US); Josef Zeevi, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 374 days.

(21) Appl. No.: 11/085,967

(22) Filed: Mar. 22, 2005

(65) Prior Publication Data

US 2006/0218359 A1    Sep. 28, 2006

(51) Int. Cl.
*G06F 12/00* (2006.01)

(52) U.S. Cl. ............................ 711/103; 711/4; 711/5; 711/100; 711/102; 711/156; 711/157; 711/200; 711/202; 711/203; 365/189.011; 365/189.04; 365/230.01; 365/230.03; 365/230.04

(58) Field of Classification Search .............. 711/5, 711/4, 100, 102–103, 156–157, 200, 202–203; 365/189.011, 189.04, 230.01, 230.03, 230.04
See application file for complete search history.

(56) References Cited

U.S. PATENT DOCUMENTS

| 4,689,765 | A | | 8/1987 | Hooper |
| 4,800,380 | A | | 1/1989 | Lowenthal et al. |
| 4,933,879 | A | | 6/1990 | Ando et al. |
| 6,081,878 | A | * | 6/2000 | Estakhri et al. ............. 711/168 |
| 6,725,321 | B1 | * | 4/2004 | Sinclair et al. ............. 711/103 |
| 6,895,490 | B1 | * | 5/2005 | Moore et al. ................ 711/203 |
| 7,020,739 | B2 | * | 3/2006 | Mukaida et al. ............ 711/103 |
| 2005/0144361 | A1 | * | 6/2005 | Gonzalez et al. ........... 711/103 |

FOREIGN PATENT DOCUMENTS

WO    WO 92/21102 A1    11/1992

* cited by examiner

*Primary Examiner*—Tuan V Thai
*Assistant Examiner*—Zhuo H Li
(74) *Attorney, Agent, or Firm*—Toler Law Group

(57) ABSTRACT

A computational system comprising a controller and a multi-plane solid state memory device accessible to the controller is disclosed. The controller is configured to provide access to a virtual block having a virtual block address that represents a first block from a first plane of the multi-plane solid state memory device and represents a second block from a second plane of the multi-plane solid state memory device.

12 Claims, 3 Drawing Sheets

METHOD AND SYSTEM FOR MANAGING MULTI-PLANE MEMORY DEVICES

FIELD OF THE DISCLOSURE

This disclosure, in general, relates to methods and systems for managing multi-plane memory devices.

BACKGROUND

Increasingly, consumers are demanding portable devices, such as personal digital assistants (PDA's), MP3 players, portable memory systems, advanced cell phone systems and cameras. Traditional non-volatile memory storage systems, such as floppy disks, hard drives, and optical drives, are generally unsuitable for use in portable devices because they suffer from mechanical failures, excess weight, large size and high energy consumption. As a result, manufacturers of portable devices are turning to solid-state memory systems, such as flash memory and electrically erasable programmable read-only memory (EEPROM).

More recently, manufacturers have introduced memory devices having multiple planes. Such multiple plane devices have been implemented in single-level cell and, in particular, in multi-level cell memory devices. In some particular examples, the devices are capable of simultaneously erasing one block within each plane. Further, some devices are able to write one page into each plane simultaneously.

However, to fully implement these capabilities into existing hardware systems, traditional methods rewrite block management software layers. Such block management software layers tend to be complex and represent a large labor investment. Moreover, block management layers have been tested with and made compatible with data storage and transfer protocols, such as filing systems, USB mass storage layers and USB media transport protocols. Changing these block management layers and routines would consume a considerable labor investment and represents a large cost in development of replacement block management software. As such, an improved method for integrating multi-plane memory devices into computational systems would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWINGS

In a particular embodiment, the disclosure is directed to a computer system including a controller coupled to a multi-plane memory device. The controller includes a device driver that represents a virtualized memory block representing a first memory block from a first plane and a second memory block from a second plane. When accessing the multi-plane memory device, the controller is configured to access a sequence of virtualized memory pages wherein a first virtualized memory page in the sequence represents a physical memory page having a particular address within a first block within the first plane and a second sequentially addressed virtual memory page represents a physical memory page located at the particular address of the second plane. The controller may be further coupled to other computational systems, such as through memory buses, USB connections, or Firewire connections.

In another exemplary embodiment, the disclosure is directed to a method of accessing a multi-plane memory device. The method includes sequentially accessing virtual address pages by accessing a first physical page located at a particular address in the first plane and accessing a second physical page at the particular address located in the second plane. In another exemplary embodiment, the method includes erasing a virtualized memory block by erasing a first physical block from the first plane and a second physical block from the second plane.

Figure 1:
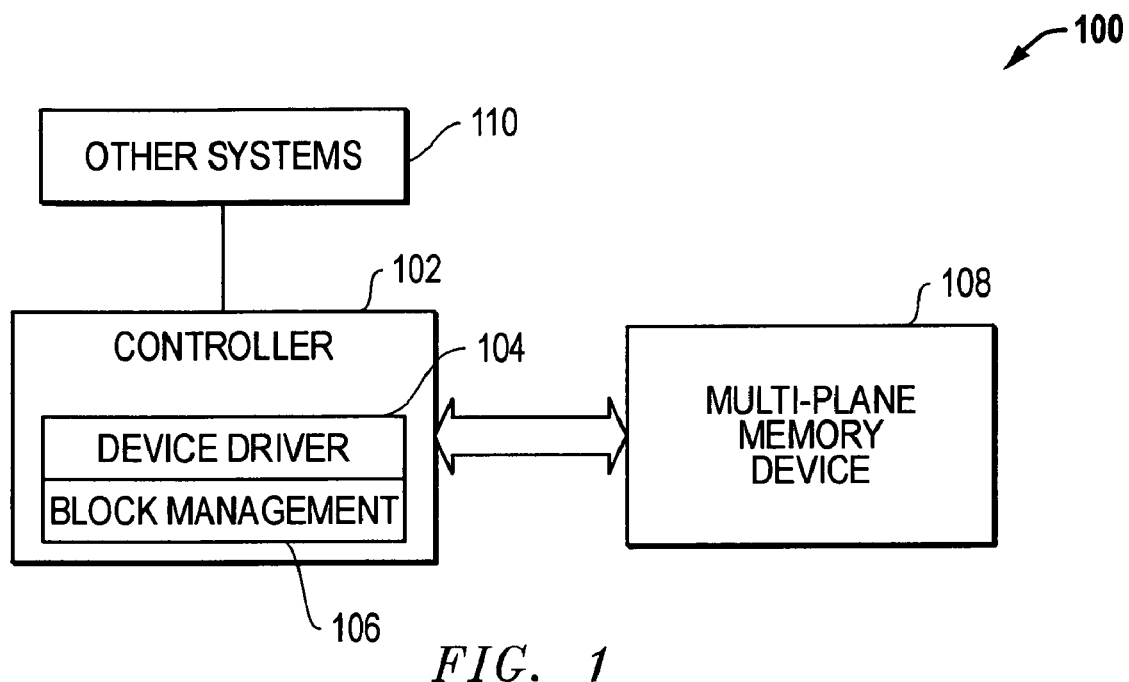
FIG. 1 includes an illustration of an exemplary embodiment of a computational system.

FIG. 1 includes an illustration of an exemplary embodiment of a computer system 100. The computer system 100 includes a controller 102 and one or more multi-plane memory devices 108. The controller 102 may be connected to the memory device 108, such as via a data bus to the memory device 108.

The memory device 108 is a multi-plane memory device, such as a multi-plane solid-state memory device. Typically, the multi-plane memory device 108 is a multi-level cell memory device. However, the multi-plane memory device 108 may be a single level cell memory device. In particular embodiments, the multi-plane memory device is a flash memory device, such as a NAND flash memory device.

The controller 102 may further be connected to other systems 110, such as via a data bus. In particular embodiments, the data bus may be a USB data bus, USB media transport, Firewire connection, or a system bus.

In the illustrated embodiment, the controller 102 includes block management software 106 and a device driver 104 configured to communicate with the multi-plane memory device 108. In a particular embodiment, the block management software 106 interacts with other systems 110 to provide and receive data for storage in and retrieval from the multi-plane memory device 108.

In a particular embodiment, the device driver 104 provides a virtualized representation of the memory addresses in the multi-plane memory device 108. In particular, the device driver 104 may present to the block management program 106 a virtual block address that represents two or more blocks, one block from each of the planes in the multi-plane memory device 108. The virtualized block may include a sequential series of virtualized pages wherein a first virtual page within the sequential virtualized pages represents a physical page located at a particular plane address within a first block in the first plane and a second virtual page represents a physical page located at a plane address in a second block in the second plane.

Figure 2:
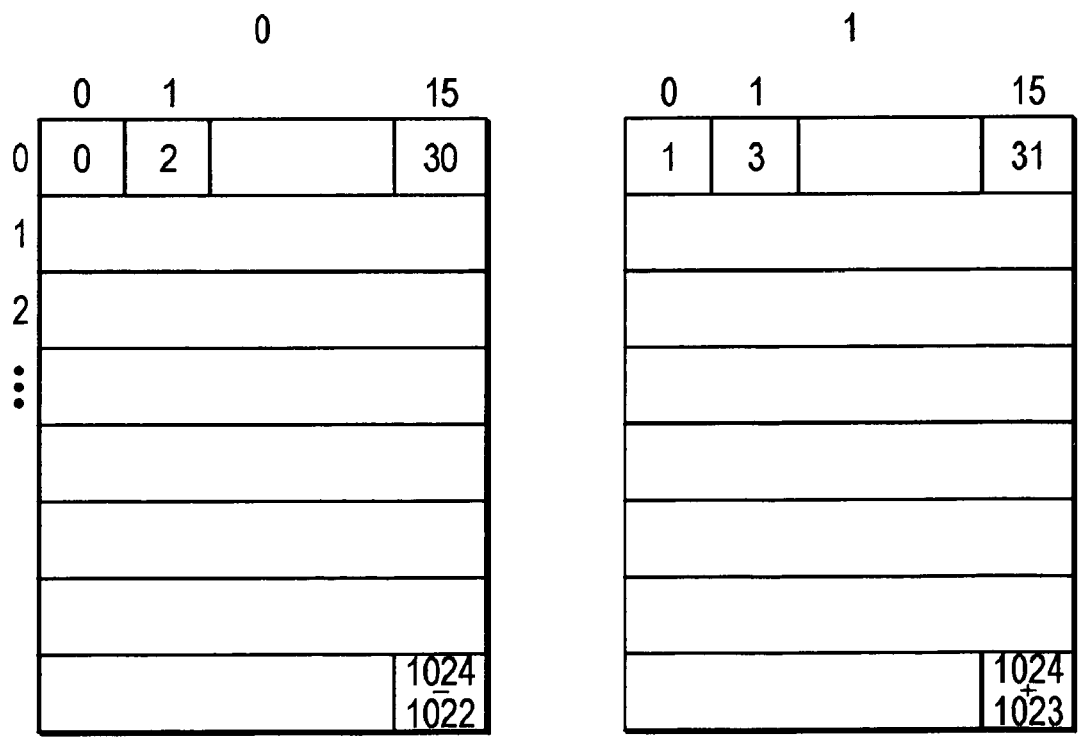
FIG. 2 includes an illustration of an exemplary embodiment of a multi-plane memory device.

FIG. 2 includes an illustration of an exemplary multi-plane memory device. The memory device includes planes 0 and 1, represented by two separate tables. Each plane includes a series of blocks represented by rows within the tables and a series of pages within those blocks are represented by columns within the rows. The controller 102 is configured to provide a virtualized block address that includes a block from each plane. In this particular example, a virtualized block 0 may include block 0 from plane 0 and block 0 from plane 1. A virtualized block may include block 1 from plane 0 and block 1 from plane 1, etc. Alternatively, the virtualized block may include any one block from the first plane and any one block from the second plane.

When accessing data in the multi-plane memory device, such as when writing data to or when reading data from the memory device, the system represents sequential virtual pages by alternating between the first plane and the second plane. Traditionally, pages are numbered, for example, sequentially within a plane (i.e., from 0 to 1023 in the first plane and from 1024 to 2047 in the second plane, etc.). Herein, the sequentially addressed virtual pages represent physical pages in alternate planes in an exemplary two plane memory device. For example, a virtual page 0 may reside at block 0, page 0, in plane 0 and a virtual page 1 may reside in block 0, page 0, of plane 1. A virtual page 2 may be located at page 1, block 0, plane 0 and a virtual page 3 may be located at page 1, block 0, and plane 1. When accessing virtual pages having sequential virtual addresses, the controller may, for example, access a first virtual page representing a first physical page located at a particular address within a first plane, and may access a second virtual page sequentially located next to the first virtual page and represented by a physical page located at the particular address within a second plane. The particular address may for example identify a particular page location within a plane or a block and page location within the block.

As such, in a two plane memory device, even virtual addresses reference physical addresses in the first plane and odd virtual addresses reference physical addresses in the second plane. The physical pages of a first plane are represented by even virtual pages 0 to 1024+1022 and physical pages of a second plane are represented by odd virtual pages 1 to 1024+1023. When more than two planes are included, a set of n sequential virtual addresses may reference one page from each of n planes. For example, physical pages of the first plane may be represented by every nth virtual address from 0 to (n−1)1024+(1023−n+1), where n is the number of planes represented in the virtual addressing.

As illustrated, the virtual block is twice the size of a block within a given plane. As such, the virtual block size is the sum of the sizes of blocks over each of the planes represented by the virtual block. In addition, the virtual block includes twice the number of pages or the sum of pages within each block within each plane represented by the virtual block. While FIG. 2 represents a two-plane memory device, the concept may be extended to multi-plane memory devices including two or more planes. Planes may be grouped to represent a virtual block including a block from each plane of the group. Alternatively, the virtual block may represent a block from each of the planes in the memory device. For example, in a four plane memory device, the virtual block may represent a third block of the third plane and a fourth block of the fourth plane in addition to the first and second blocks of the first and second planes, respectively.

Such a representation may utilize multi-plane memory device features, such as the ability to erase a block from each plane simultaneously. In addition, the virtual representation of memory pages may take advantage of the capabilities of multi-plane memory devices by accessing a page in each plane simultaneously, such as writing more than one page to the memory device simultaneously.

Figure 3:
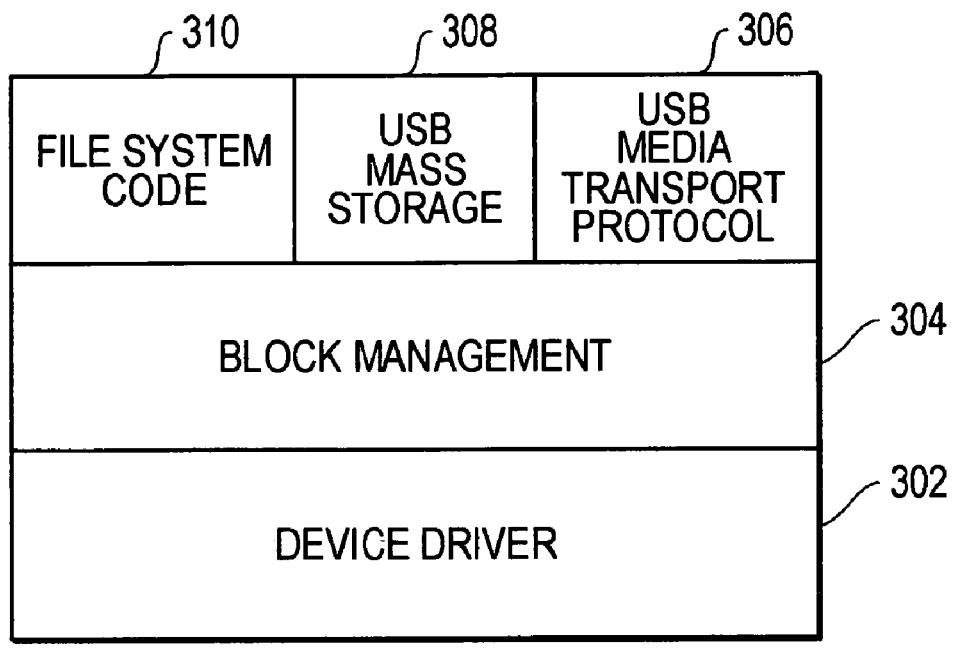
FIG. 3 includes an illustration of an exemplary embodiment of software for facilitating data transfer.

In a particular embodiment, a controller, as illustrated in FIG. 3, implements the virtualizing of the memory addressing. For example, a device driver 302 virtualizes the memory addresses and provides a virtualized representation to the block management system 304. The block management system 304 interfaces with data transfer protocols, such as file systems 310, USB mass storage protocols 308, and USB media transport protocols 306. For example, the device driver 302 may represent a virtual block having a size equal to the sum of the block sizes of each of the planes in a multi-plane memory device. For example, in a two-plane memory device having block sizes of 32K, the virtualized memory block may have a size of 64K. The device driver 302 may also represent the virtualized memory block as having a number of pages equal to the sum of the number of pages in each block for each of the memory planes. For example, if a block within a plane includes 16 pages, the virtualized block may include 32 pages when representing a two-plane memory device.

Using the virtualized memory addresses, the block management system 304 may communicate with the other systems 306, 308 and 310 using standardized and tested methods. For example, the block management system 304 may send a request for data to the device driver 302 and forward retrieved data to other systems. In another example, the block management software 304 may receive data from other systems and request that the data be stored at a virtual address. In a further example, the block management software 304 may request that a virtual block be erased. When using the virtual addressing, the block management software 304 may be generally unaware of or lack knowledge of the actual architecture of the multi-plane memory device.

In a particular embodiment, blocks may be periodically tested for error rates and a block may be marked as invalid when the block fails to store or provide correct data. In one embodiment, when a block of one plane represented by a virtual block is invalid, the entire virtual block may be marked as invalid. In an alternative embodiment, the virtual block may be formed of blocks that are valid despite their physical address within a plane. As such, a virtual block may represent a block at a first block address in a first plane and a block at a different block address in a second plane.

Figure 4:
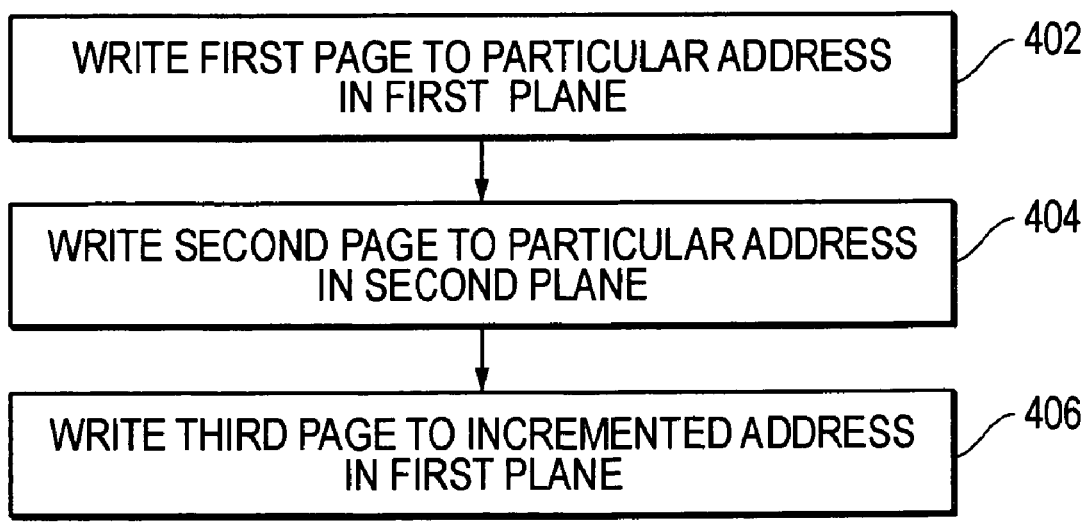
FIGS. 4 and 5 include illustrations of exemplary methods for use in computational systems, such as the system illustrated in FIG. 1.

When accessing the multi-plane memory device, such as, for example, when writing to the multi-plane memory device, the block management program 304 may send data to the device driver 302 for storage at a virtual block address and a set of virtual page locations. FIG. 4 includes an illustration of an exemplary method for writing pages. For example, the system may write a first page having a first virtual address to a page having a particular plane address in a first plane, as illustrated at 402, and may write a second page having a sequential second virtual address to a page having the particular address within a second plane, as illustrated at 404. In a particular embodiment, the first page and the second page may be written substantially simultaneously to take advantage of capabilities of the multi-plane device architecture. A third page having a sequential third virtual address may be written to a page having an address incrementally higher than the particular plane address in the first plane, as illustrated at 406. For example, the first page may be located a page 0, block 0, plane 0, the second page may be written to page 0, block 0, plane 1, and the third page may be written to page 1, block 0, plane 0. Furthermore, a fourth page having a sequential fourth virtual address may be written to a page having the incremented address in a second plane (e.g., page 1, block 0, plane 1).

When reading pages, the block management device may request pages sequentially located in the virtual addressing map. In one embodiment, when any two requested pages are located on different planes, the pages may be read simultaneously.

Figure 5:
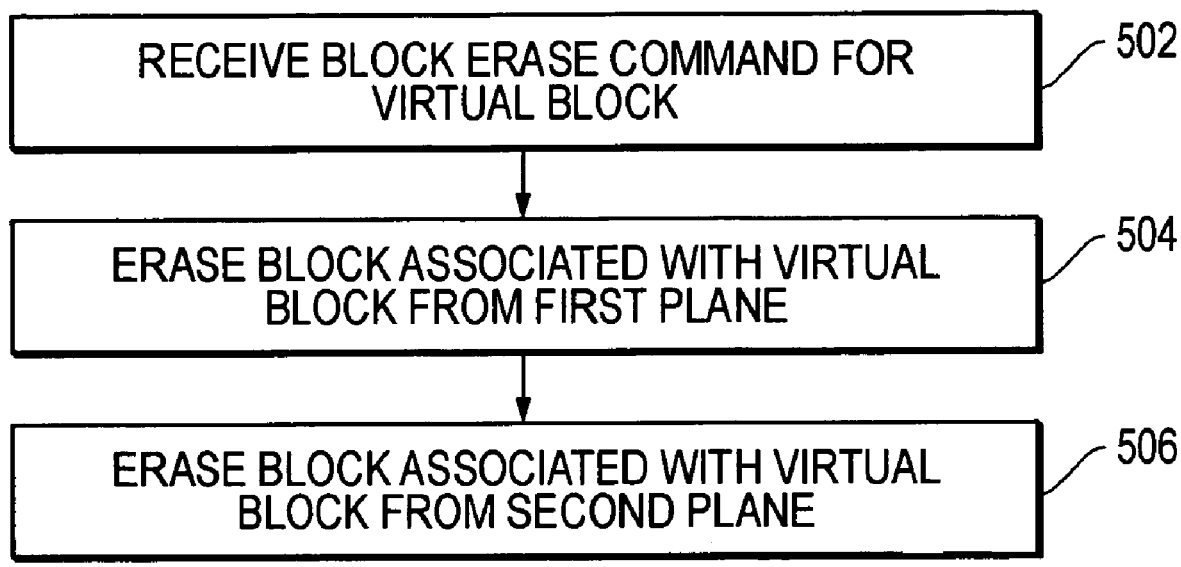

FIG. 5 represents a method for erasing blocks. The device driver receives a block erase command from the block management software, requesting erasure of a virtual block, asillustrated at 502. The device manager instructs the multi-plane memory device to erase a block associated with the virtual block from the first plane, as illustrated at 504, and to erase a block associated with the virtual block from the second plane, as illustrated at 506. Based on the capabilities of a multi-plane memory device, the block of the first plane and the block of the second plane may be erased concurrently.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computational system comprising:
a multi-plane solid state memory device having an architecture that includes a first plane and a second plane, each of the first plane and the second plane including a plurality of blocks, each block of the plurality of blocks including a plurality of pages; and
a controller coupled to the multi-plane solid state memory device and configured to communicate with a second computational system, the controller including:
block management software configured to communicate with the second computational system using a virtual block address; and
a device driver configured to communicate with the multi-plane solid state memory device and configured to provide the virtual block address to the block management software to enable the block management software to communicate with the second computational system without knowledge of the architecture of the multi-plane solid state memory device, wherein the virtual block address represents two or more blocks including a first block from the plurality of blocks included in the first plane and a second block from the plurality of blocks included in the second plane;
wherein the controller is configured to write a first virtually addressed page to a first page of the first plane and to write a second virtually addressed page to a second page of the second plane, wherein the second virtually addressed page is located sequentially next to the first virtually addressed page, and wherein writing the first virtually addressed page and writing the second virtually addressed page are performed substantially simultaneously.

2. The computational system of claim 1, wherein the first page of the first plane and the second page of the second plane have the same within plane address.

3. The computational system of claim 1, wherein the controller is configured to read the first virtually addressed page from the first page of the first plane and to read the second virtually addressed page from the second page of the second plane.

4. The computational system of claim 3, wherein the first page and the second page are physical pages having the same within plane address.

5. The computational system of claim 3, wherein the first page of the first plane and the second page of the second plane are read concurrently.

6. The computational system of claim 1, wherein the virtual block address represents a virtual block that has a size equal to a sum of a size of the first block and a size of the second block.

7. The computational system of claim 1, wherein the virtual block address represents a virtual block that includes a number of virtual pages at least equal to a sum of a number of pages in the first block and a number of pages in the second block.

8. The computational system of claim 1, wherein the virtual block address further represents a third block of a third plane included in the architecture of the multi-plane solid state memory device.

9. The computational system of claim 1, wherein the controller is configured to erase a virtual block represented by the virtual block address by directing the multi-plane solid state memory device to erase the first block and the second block.

10. The computational system of claim 9, wherein the multi-plane solid state memory device is configured to erase the first block and the second block substantially simultaneously.

11. A method comprising:
providing a virtual block address representing a virtual block to block management software of a controller coupled to a multi-plane solid state memory device having a particular architecture that includes a first plane and a second plane, each of the first plane and the second plane including a plurality of blocks, each block of the plurality of blocks including a plurality of pages, wherein the block management software is configured to communicate with a system using the virtual block address without knowledge of the particular architecture of the multi-plane solid state memory device, and wherein the virtual block address represents two or more blocks including a first block from the plurality of blocks included in the first plane and a second block from the plurality of blocks included in the second plane;
communicating with the system via the block management software using the virtual block address;
receiving a request to access the virtual block from the system;
sending the virtual block address representing the virtual block and a plurality of virtual page locations to a device driver coupled to the multi-plane solid state memory device;
writing a first virtual page to a first physical page located at a particular address within the first plane; and
writing a second virtual page to a second physical page located at the particular address within the second plane, wherein the first virtual page and the second virtual page are sequential, and wherein the writing of the second virtual page is performed substantially simultaneously to the writing of the first virtual page.

12. The method of claim 11, further comprising receiving a second request that includes a request to erase the virtual block and wherein the method further comprises concurrently erasing the first block of the plurality of blocks included in the first plane and erasing the second block of the plurality of blocks included in the second plane.

* * * * *